United States Patent
Barbisch

Patent Number: 6,013,993
Date of Patent: *Jan. 11, 2000

[54] BRAKING CIRCUIT FOR A UNIVERSAL MOTOR

[75] Inventor: Benedikt Barbisch, Langedorf, Switzerland

[73] Assignee: Robert Bosch GmbH, Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/454,108
[22] PCT Filed: Sep. 7, 1994
[86] PCT No.: PCT/EP94/03261
  § 371 Date: May 26, 1995
  § 102(e) Date: May 26, 1995
[87] PCT Pub. No.: WO95/09478
  PCT Pub. Date: Apr. 6, 1995

[30] Foreign Application Priority Data

Sep. 29, 1993 [DE] Germany ............... 43 33 064

[51] Int. Cl.[7] ............................................. H02P 3/08
[52] U.S. Cl. .................... 318/379; 318/245; 318/246; 318/375
[58] Field of Search ................... 318/375, 376, 318/258, 269, 250, 251, 252, 245, 380, 248, 362, 370, 139, 379, 381, 246

[56] References Cited

U.S. PATENT DOCUMENTS

| | | | |
|---|---|---|---|
| 3,936,709 | 2/1976 | Wright | 318/269 |
| 3,969,661 | 7/1976 | Morinaga et al. | 318/375 |
| 3,976,927 | 8/1976 | Puschel et al. | 318/368 |
| 4,114,076 | 9/1978 | Teranishi et al. | 318/139 |
| 4,275,341 | 6/1981 | Huber et al. | 318/376 |
| 4,329,630 | 5/1982 | Park | 318/258 |
| 4,380,724 | 4/1983 | Franz, Jr. et al. | 318/252 |
| 4,423,363 | 12/1983 | Clark et al. | 318/375 |
| 4,443,744 | 4/1984 | Konrad | 318/269 |
| 4,639,647 | 1/1987 | Posma | 318/247 |
| 5,552,686 | 9/1996 | Schmid et al. | 318/362 |
| 5,708,333 | 1/1998 | Kirn | 318/246 |

FOREIGN PATENT DOCUMENTS

| | | |
|---|---|---|
| 0032980 | 8/1981 | European Pat. Off. . |
| 0326146 | 8/1989 | European Pat. Off. . |
| 438469 | 12/1967 | Switzerland . |
| 501334 | 2/1971 | Switzerland . |

*Primary Examiner*—Bentsu Ro
*Attorney, Agent, or Firm*—Michael J. Striker

[57] ABSTRACT

A braking circuit for a universal motor is proposed, in which, during braking, the at least one field winding is connected in series with the armature by means of a semi-conductor switch, preferably a field effect transistor or a thyristor. Since the semiconductor switch can also be switched intermittently and with a time delay, not only is it possible to regulate the braking current simply, but there is also a reduced formation of sparks at the collector. The reduction in the contact erosion lengthens the service life and increases the reliability of the motor.

8 Claims, 1 Drawing Sheet

BRAKING CIRCUIT FOR A UNIVERSAL MOTOR

This application in a National Stage of International Application, PCT/EP94/03261, under 35 USC §371, filed Sep. 7, 1994.

The invention relates to a braking circuit for a universal motor in which, for the purpose of braking, one or both field windings are switched with reverse polarity into the armature circuit. Such a polarity reversal is disclosed, for example, in DE 38 02 419 A1. The polarity reversal is performed in this case by means of anti-parallel-connected diodes for both field windings. Furthermore, a switch is provided, by means of which the two field winding terminals facing the armature are short circuited for braking purposes. This short circuit is produced immediately by actuating the switch, with the result that, because of the remanence in the field coils, a strong braking current is set up, which is accompanied by undesirable brush sparking. This brush sparking causes premature wear at the collector of the motor. In addition, in the known circuit, the braking current is not controllable, with the result that, in the case of a high rotational speed accompanied by self-induction, a strong braking current is initially set up, which become weaker with decreasing rotational speed. The braking effect is thereby very irregular over the braking time.

SUMMARY OF THE INVENTION

Accordingly, it is an object of the present invention to provide a braking circuit for universal motor, which avoids the disadvantages of the prior art.

In keeping with these objects and with others which will become apparent hereinafter, one feature of the present invention resides, briefly stated, in a braking circuit for a universal motor, which has a switching device reversing a polarity of at least one field winding of the motor for braking operation to be connected in parallel with an armature of the universal motor, the switching device has a controllable semiconductor switch, and the semi-conductor switch is connected in a power path to a terminal side facing the armature, of the first and second field windings.

The braking circuit according to the invention has, in contrast, the advantage that a controllable semiconductor switch is switched instead of the mechanical switch. This results in the advantage that no contact erosion can occur at the switch, since the semiconductor switch operates without wear. However, it is particularly advantageous that the braking characteristic can be precisely controlled by closing the semiconductor switch in a temporally defined fashion.

It is particularly advantageous that the semiconductor switch can be switched intermittently by a control circuit, since the braking current can thereby be arbitrarily regulated. If, for example, the semiconductor switch is conducting, self-excitation occurs. In this case, kinetic energy of the rotor is converted into magnetic energy during braking. When the current has reached a specific upper limiting value, the switch can be reopened, with the result that the current still flows only in the field windings. There, the magnetic energy is converted into heat in this circuit until the current has once again reached a lower limiting value, at which the semiconductor switch is reclosed. A particular advantage yielded by the intermittent operation is a limitation of the braking current, and thus not only lower wear of the carbon brushes, but also soft braking, which is desired, for example, in the case of circular saws or angle grinders. It is particularly advantageous that the kinetic energy and magnetic energy are converted into heat chiefly in the motor and not in the semiconductor component. As a result, it is also possible to use a smaller heat sink.

It is, furthermore, advantageous that the control circuit for driving the semiconductor switch has a further transistor. The semiconductor switch can be driven in low-loss fashion by means of this transistor.

In order to reduce the brush sparking it is, furthermore, advantageous when the closing of the semiconductor for braking the rotating armature is performed with a time delay. If, for example, the line current is interrupted for longer than ten milliseconds, the semiconductor switch switches through, with the result that the braking current is built up owing to the self-excitation. A further effect of the time-delayed switching of the semiconductor switch is that the magnetic field energy in the field coils has decreased to such an extent that, when use is made of the braking current, the production of the brush sparking is largely suppressed. The service life and reliability of the motor are substantially improved by virtue of the lower wear.

A preferred application of the braking circuit according to the invention relates to an electric hand tool in which rotating blades or saws naturally represent a high potential risk for the operator.

BRIEF DESCRIPTION OF THE DRAWINGS

An exemplary embodiment of the invention is represented in the drawing and explained in more detail in the following description.

DESCRIPTION OF PREFERRED EMBODIMENT

Figure 2:
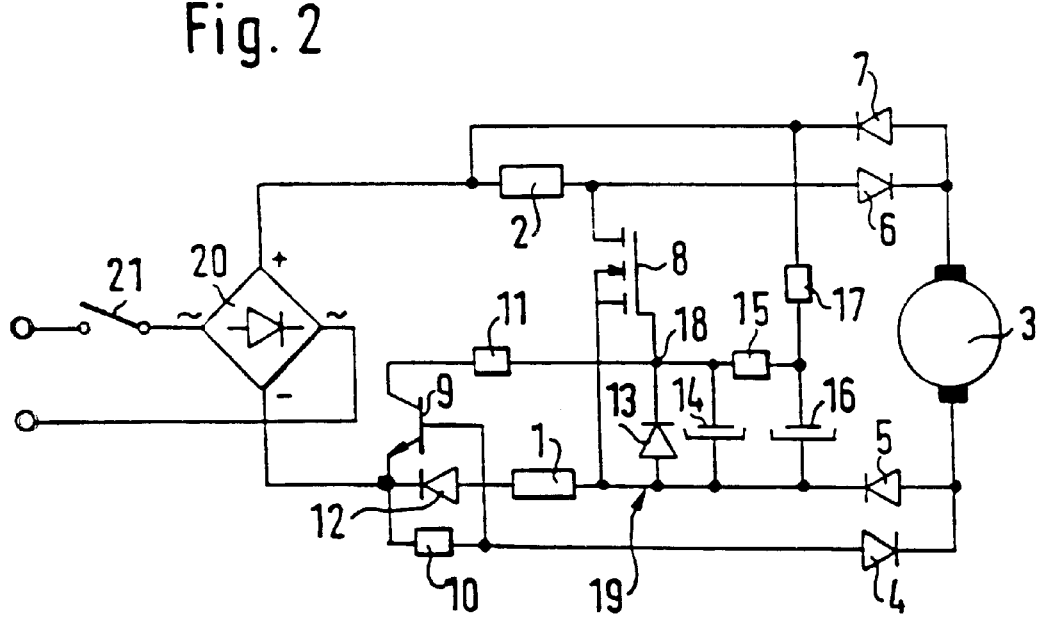
FIG. 2 shows an exemplary embodiment of the invention.

In accordance with FIG. 2, the exemplary embodiment according to the invention exhibits a serieswound motor which is constructed as a universal motor and has a first field winding 1, a second field winding 2 and an armature 3. Two anti-parallel-connected diodes 4, 5 and 6, 7 are respectively connected in series via the field windings 1, 2 to the armature 3. The diodes 4, 5, 6, 7 are used to reverse the polarity of the field windings 1, 2 in braking operation. The power path of a semiconductor switch, for example of a field effect transistor or of a thyristor 8, is connected on the side of the field windings 1, 2 which faces the armature 3. A control input 18 of the semiconductor switch 8 is connected via a series resistor 11 to the collector of a transistor 9 whose emitter is connected to ground. Furthermore, a diode 13, a first capacitor 14 and a second resistor 15 are connected on the anode side to the control input 18. The respectively second terminals of the first diode 13 and of the first capacitor 14 are connected to the internal grounding line 19 to the first field coil 1. The second terminal of the second resistor 15 is connected, on the one hand, via a third resistor 17 to the anode of the diode 7, which for its part is connected to the positive together with the still free terminal of the second field winding 2. On the other hand, the second resistor 15 and the third resistor 17 are jointly connected to a second capacitor 16 whose second terminal is likewise connected to the internal grounding line 19. Connected between the base and the emitter of the transistor 9 in parallel with the emitter diode is a second diode 12, and parallel therewith, a fourth resistor 10. Provided for the purpose of supplying the motor is a rectifier circuit 20 in a bridge circuit which is connected to line voltage via a master switch 21.

The method of functioning of this circuit arrangement is explained in more detail below with the aid of FIGS. 1 and 2. The principle of the method of functioning is firstly explained for the known circuit in accordance with FIG. 1, identical functional units being provided with identical reference numerals.

The rectifier 20 supplied via the master switch 21 supplies a DC voltage to the electric motor having the field windings 1, 2 and the armature 3. With the switching contact of the switch 8 open, a motor current flows, during motor operation, via the positive terminal of the second field winding, the diode 6 and the armature 3, and back via the diode 5 and the first field winding 1 to the negative terminal. During braking operation, the master switch 21 is opened and the switching contact of the switch 8 is simultaneously closed. In the prior art (FIG. 1), this switchover is performed simultaneously, since both the switch 8 and the switch 21 are mechanically coupled to one another. The field coils 1, 2 are then connected in series with the armature 3 by the closure of the contact of the switch 8. Here, because of the remanence and the rotational speed of the armature, a field current flows via the diode 7, the second field winding 2, the switch 8 and the first field winding 1, and back via the diode 4 to the armature 3. This current flows until the motor is braked and the magnetic field has collapsed inward on itself. The braking current in said circuit is set up suddenly upon closure of the switching contact of the switch 8, since the self-excitation is built up immediately as a consequence of the remanence of the field coils.

By contrast with this, it is proposed according to the invention that, instead of the switch 8, a semiconductor be used, which can be driven via a control circuit 9 to 18. A field effect transistor, thyristor, GTO (Gate Turn-On Thyristor) or IGBT (Isolated Gate Bipolar Transistor), for example, can be used as the semiconductor switch 8. Furthermore, the electric motor may have only one field winding, which is switchable.

Figure 1:
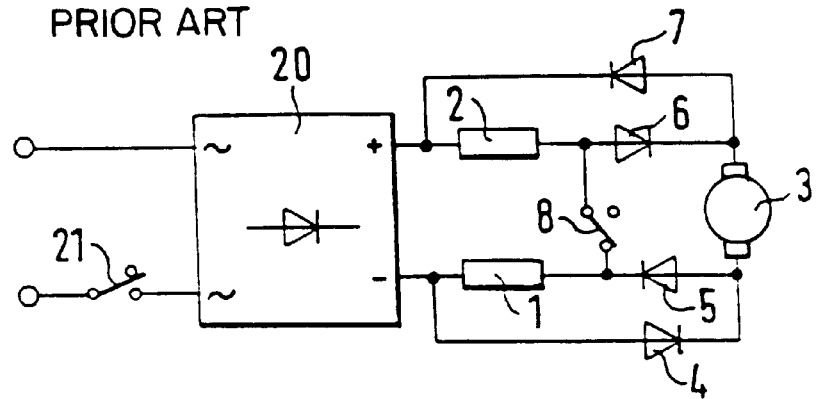
FIG. 1 shows a known braking circuit.

The method of functioning in motor operation is described, as previously, relative to FIG. 1. If the master switch 21 is closed, a direct current or a DC voltage is supplied by the rectifier 20, which forms a circuit with the armature 3 via the first and second field windings 1, 2 and the diodes 6, 5. The semiconductor switch 8 is not driven in this case and therefore has a high resistance, since, in this operating state, the transistor 9 is conducting because of the diode 12 and draws down the control input 18.

During braking, the switch 21 is opened and thus the DC voltage supply is interrupted. The transistor 9 therefore receives no control voltage and is blocked. As a result, the voltage level at the control input 18 rises, the semiconductor switch 8 thereby being rendered conducting. The two field coils 1, 2 are thereby connected to one another with a low resistance. This state occurs with a time delay, for example after 10 milliseconds, because of the timing element comprising the capacitors 14, 16 and the resistors 15, 17. Since a current is still flowing in the field windings, the self-excitation for braking purposes is ensured. Reliable braking function is thereby ensured, for example, in the case of electric hand tools such as hedge cutters, saws or grinders.

In a further embodiment of the invention, provision is made, for the purpose of controlling the braking current, for the semiconductor switch 8 to be closed and opened intermittently by means of an impulse circuit (not represented). Such an impulse circuit can be constructed, for example, by means of a known multivibrator whose frequency is a measure of the field current or braking current. As a result, the braking current can advantageously be controlled or else regulated in a simple way when a desired value is prescribed. A desired value can be set, for example, by means of a comparator (not represented).

Of course, instead of the diodes 4, 5, 6, 7, it is also possible to provide mechanical changeover switches which are coupled to the master switch 21.

On each occasion when the line voltage is briefly interrupted, the brake comes on after the expiry of the delay time. This can be advantageous in particular when, for example, the electric hand tool cuts through the power cable inadvertently. The risk of injury to the user is thus largely ruled out.

It is also possible to make provision for simple two-hand operation, two hand switches being connected in series with the power supply unit. As soon as one switch is opened, the flow of current is interrupted and braking begins.

I claim:

1. A braking circuit for a universal motor having first and second field windings and an armature, said armature is serially connected to the first and second field windings, the braking circuit comprising:

a controllable semiconductor switch for reversing a polarity of at least one of said first and second field windings, said semiconductor switch is connected in parallel to said armature and having a control input;

a control circuit intermittently connectable to the control input of said semiconductor switch;

a time delay circuit connected to the control input of the semiconductor switch and to the control circuit for closing said semiconductor switch with a time delay.

2. A braking circuit as defined in claim 1, wherein said semiconductor switch is a field effect transistor.

3. A braking circuit as defined in claim 2, wherein said control circuit has at least one transistor.

4. A braking circuit as defined in claim 1, wherein said semiconductor switch is a thyristor.

5. A braking circuit as defined in claim 1, wherein said semiconductor switch is a gate turn-on thyristor.

6. A braking circuit as defined in claim 1, wherein said semiconductor switch is an isolated gate bipolar transistor.

7. A braking circuit as defined in claim 1, wherein said semiconductor switch is connected at the control input to said control circuit via a resistor so that in a motor operation said semiconductor switch is blocking and in a braking operation it is switched through.

8. A braking circuit as defined in claim 1, wherein the braking circuit is formed so that it is used for an electric hand tool.

* * * * *